US007930932B2

(12) United States Patent
Kariya et al.

(10) Patent No.: US 7,930,932 B2
(45) Date of Patent: Apr. 26, 2011

(54) NOX SENSOR ABNORMALITY DETECTION DEVICE AND EXHAUST GAS PURIFICATION SYSTEM USING THE SAME

(75) Inventors: Yasuhiro Kariya, Obu (JP); Kanehito Nakamura, Ichinomiya (JP)

(73) Assignee: Denso Corporation, Kariya (JP)

( * ) Notice: Subject to any disclaimer, the term of this patent is extended or adjusted under 35 U.S.C. 154(b) by 282 days.

(21) Appl. No.: 12/401,110

(22) Filed: Mar. 10, 2009

(65) Prior Publication Data

US 2009/0229356 A1 Sep. 17, 2009

(30) Foreign Application Priority Data

Mar. 12, 2008 (JP) .................................... 2008-62639

(51) Int. Cl.
*G01M 15/10* (2006.01)
(52) U.S. Cl. .................................. 73/114.73; 73/114.77
(58) Field of Classification Search ............... 73/114.69, 73/114.71, 114.73, 114.77
See application file for complete search history.

(56) References Cited

U.S. PATENT DOCUMENTS

| 6,843,240 B1 * | 1/2005 | Hahn et al. ..................... 123/688 |
| 2009/0139212 A1 * | 6/2009 | Miwa .............................. 60/277 |
| 2009/0151425 A1 * | 6/2009 | Miwa ........................... 73/23.31 |
| 2009/0173140 A1 * | 7/2009 | Sumitani ..................... 73/23.31 |

FOREIGN PATENT DOCUMENTS

JP 2002-47979 2/2002

\* cited by examiner

*Primary Examiner* — Eric S McCall
(74) *Attorney, Agent, or Firm* — Nixon & Vanderhye PC

(57) ABSTRACT

A NOx sensor abnormality detection device senses a NOx concentration and an O2 concentration from output signals of a NOx sensor and calculates an estimated NOx concentration from the O2 concentration when an engine is in a steady operation state, when a zero point of the NOx concentration is sensed, and when an O2 sensing section of the NOx sensor is normal. The NOx sensor abnormality detection device calculates a sensed inclination and an estimated inclination of a NOx concentration output characteristic of the NOx sensor based on the sensed NOx concentration, the sensed O2 concentration and the estimated NOx concentration calculated from the O2 concentration. The NOx sensor abnormality detection device determines that the NOx sensor is faulty when an absolute value of a difference between the sensed inclination and the estimated inclination is larger than a predetermined value.

6 Claims, 3 Drawing Sheets

NOX SENSOR ABNORMALITY DETECTION DEVICE AND EXHAUST GAS PURIFICATION SYSTEM USING THE SAME

CROSS REFERENCE TO RELATED APPLICATION

This application is based on and incorporates herein by reference Japanese Patent Application No. 2008-62639 filed on Mar. 12, 2008.

BACKGROUND OF THE INVENTION

1. Field of the Invention

The present invention relates to a NOx (i.e., nitrogen oxides) sensor abnormality detection device for detecting an abnormality in a NOx sensor provided downstream of a NOx purification device and to an exhaust gas purification system using the NOx sensor abnormality detection device.

2. Description of Related Art

Conventionally, there is a publicly known exhaust gas purification system that has a NOx sensor provided downstream of a NOx purification device, which purifies NOx in exhaust gas, for sensing a NOx concentration and that determines NOx purification quantity of the NOx purification device based on an output signal of the NOx sensor (for example, as described in Patent document 1: JP-A-2002-47979).

Such the exhaust gas purification system is required to detect an abnormality in the NOx sensor due to degradation, a failure and the like in order to accurately sense the NOx purification quantity of the NOx purification device.

The technology of Patent document 1 determines the abnormality in the NOx sensor based on an estimated NOx concentration and the NOx concentration sensed with the NOx sensor in a specific state where the NOx concentration in the exhaust gas can be estimated. For example, the technology of Patent document 1 detects the abnormality in the NOx sensor by determining whether the output signal of the NOx sensor is a value equivalent to zero of the NOx concentration in an operation state where a fuel cut state occurs and NOx emission quantity from the internal combustion engine is estimated to be zero.

A deviation of the NOx concentration, which is sensed based on the output signal of the NOx sensor in an abnormal period when a gain deviation is caused in the output of the NOx sensor and an inclination of an output characteristic of the NOx sensor has changed, from the NOx concentration sensed based on the output signal of the NOx sensor when the NOx sensor is normal reduces as the NOx concentration sensed with the NOx sensor reduces.

Therefore, if the abnormality in the NOx sensor is detected by determining whether the output signal of the NOx sensor is a value equivalent to zero of the NOx concentration in the operation state where the NOx concentration is estimated to be zero as the specific state where the NOx concentration can be estimated in Patent document 1, it is difficult to distinguish between the normality and the abnormality of the NOx sensor.

Moreover, when the gain deviation and an offset deviation are caused in the output of the NOx sensor, in some cases, the estimated NOx concentration in a specific state other than the zero point where the NOx concentration can be estimated coincides with the sensed NOx concentration sensed with the NOx sensor. As a result, there is a possibility that the abnormality in the NOx sensor cannot be detected although the gain deviation and the offset deviation are caused in the output of the NOx sensor.

SUMMARY OF THE INVENTION

It is an object of the present invention to provide a NOx sensor abnormality detection device capable of detecting an abnormality in a NOx sensor with high accuracy and an exhaust gas purification system using the NOx sensor abnormality detection device.

According to an aspect of the present invention, an abnormality detection device of a NOx sensor that has a NOx sensing section for sensing a NOx concentration in exhaust gas and an O2 (i.e., oxygen) sensing section for sensing an O2 concentration in the exhaust gas calculates a sensed inclination of an output of the NOx sensing section based on the NOx concentration sensed with the NOx sensing section in a steady operation state of an internal combustion engine and the NOx concentration sensed with the NOx sensing section at a zero point of the NOx concentration.

If the O2 sensing section is normal, the O2 concentration sensed with the O2 sensing section when the NOx sensing section senses the NOx concentration in the steady operation state for the calculation of the sensed inclination is a correct value.

It is known that there is a correlation between EGR (i.e., exhaust gas recirculation) quantity and the O2 concentration in the exhaust gas and there is also a correlation between the EGR quantity and the NOx concentration in the exhaust gas. Therefore, the NOx concentration in the exhaust gas can be estimated based on the O2 concentration in the exhaust gas. When the EGR is not performed, the correlation in the case where the EGR quantity is zero arises.

Therefore, according to another aspect of the present invention, if it is determined that the O2 sensing section is normal, an estimate of the NOx concentration is calculated based on the O2 concentration sensed with the O2 sensing section when the NOx sensing section senses the NOx concentration in the steady operation state for the calculation of the sensed inclination. Hereafter, the estimate of the NOx concentration is referred to also as an estimated NOx concentration. Then, an estimated inclination of the output of the NOx sensing section in the case where the NOx sensing section is normal is calculated based on the calculated estimate of the NOx concentration. Further, the abnormality in the NOx sensor is determined based on the sensed inclination and the estimated inclination, which are calculated.

Thus, instead of comparing the sensed NOx concentration sensed with the NOx sensor and the estimated NOx concentration at a single specific point, the abnormality in the NOx sensor is determined based on the sensed inclination and the estimated inclination of the output of the NOx sensing section. As a result, when the abnormality of the gain deviation is caused in the output of the NOx sensing section, the abnormality can be determined with high accuracy.

According to another aspect of the present invention, even if the offset deviation is caused in the output of the NOx sensing section, it is not determined that the NOx sensor is abnormal as long as the deviation of the inclination of the output (i.e., the gain deviation) is within a predetermined range. The offset deviation amount of the output of the NOx sensing section can be calculated based on the zero point of the NOx concentration sensed with the NOx sensing section when the gas atmosphere in the exhaust passage is equivalent to the atmospheric air and the NOx concentration is zero.

Thus, even if the offset deviation is caused in the output of the NOx sensing section, the NOx concentration can be sensed with the NOx sensor in consideration of the offset deviation as long as the gain deviation is within the predetermined range.

According to another aspect of the present invention, an atmosphere determination device determines that the gas atmosphere in the exhaust passage is equivalent to the atmospheric air if an exhaust gas discharge device discharges the exhaust gas of the exhaust passage to an outside when the internal combustion engine stops.

Since the fuel injection to the internal combustion engine stops when the internal combustion engine stops, toxic substance containing the NOx is not discharged from the internal combustion engine. Therefore, in this case, by discharging the exhaust gas of the exhaust passage to the outside, the gas atmosphere in the exhaust passage can be rendered equivalent to the atmospheric air and the NOx concentration can be brought to zero.

According to another aspect of the present invention, the exhaust gas discharge device discharges the exhaust gas of the exhaust passage to the outside by fully opening a throttle valve when the internal combustion engine stops.

Thus, when the internal combustion engine stops, the exhaust gas of the exhaust passage is discharged to the outside by the intake air suctioned through the throttle valve by pumping of the internal combustion engine during a period since the combustion in the cylinder stops until the rotation of the internal combustion engine stops. As a result, the gas atmosphere in the exhaust passage becomes equivalent to the atmospheric air, and the NOx concentration becomes zero. In this way, since the exhaust gas in the exhaust passage can be discharged to the outside using the throttle valve, which controls the intake quantity to the internal combustion engine, there is no need to newly provide a mechanism for discharging the exhaust gas of the exhaust passage to the outside.

According to another aspect of the present invention, the atmosphere determination device determines that the gas atmosphere in the exhaust passage is equivalent to the atmospheric air when fuel cut during deceleration of the internal combustion engine is performed.

Since the combustion in the cylinder stops during the fuel cut, the toxic substance containing the NOx is not discharged from the internal combustion engine into the exhaust passage. As a result, if the fuel cut state continues, the exhaust gas is discharged to the outside from the exhaust passage, and the NOx concentration in the exhaust passage becomes zero.

According to yet another aspect of the present invention, an O2 sensing section determination device determines that the O2 sensing section is normal when the atmosphere determination device determines that the gas atmosphere in the exhaust passage is equivalent to the atmospheric air and the O2 concentration sensed with the O2 sensing section is equal to the O2 concentration in the atmospheric air.

If the gas atmosphere in the exhaust passage is equivalent to the atmospheric air, it can be determined whether the O2 sensing section is normal by comparing the O2 concentration sensed with the O2 sensing section and the O2 concentration in the atmospheric air.

The functions of the devices according to the present invention are realized by hardware resources having functions specified by construction thereof, hardware resources having functions specified by programs, or combination of these hardware resources. The functions of the devices are not limited to those realized by the hardware resources physically separate from each other.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
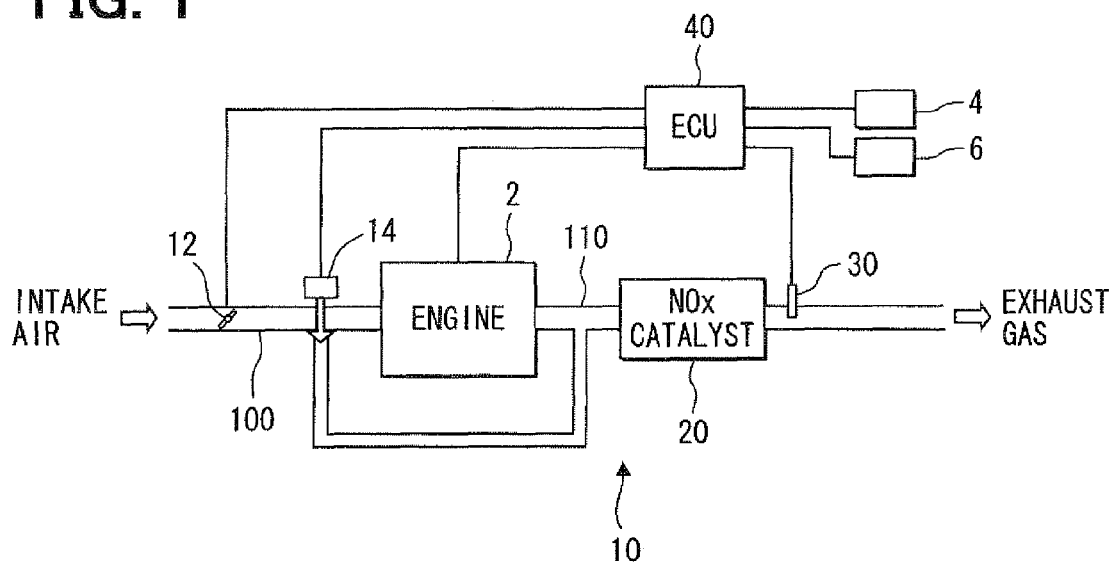
FIG. 1 is a block diagram showing an exhaust gas purification system according to an embodiment of the present invention.

Hereinafter, an embodiment of the present invention will be described with reference to the drawings. An exhaust gas purification system 10 according to the present embodiment is shown in FIG. 1. The exhaust gas purification system 10 according to the present embodiment includes a throttle valve 12, an EGR valve 14, a NOx catalyst 20, a NOx sensor 30, an electronic control unit 40 (ECU) and the like. The exhaust gas purification system 10 purifies exhaust gas discharged from a diesel engine 2 (hereinafter, referred to simply as an engine) into an exhaust passage 110. Fuel accumulated in a common rail (not shown) is injected from an injector into the engine 2.

The throttle valve 12 and the EGR valve 14 are electromagnetic valves, opening degrees of which are controlled based on an engine operation state. The throttle valve 12 controls intake quantity suctioned from an intake passage 100 into the engine 2. The EGR valve 14 regulates EGR quantity recirculated from the exhaust passage 110 to the intake passage 100 based on the engine operation state.

The NOx catalyst 20 is a NOx purification device that reduces NOx using the fuel added through a fuel addition valve (not shown) or a urea solution added through a urea addition valve (not shown) as a reducing agent.

Figure 2:
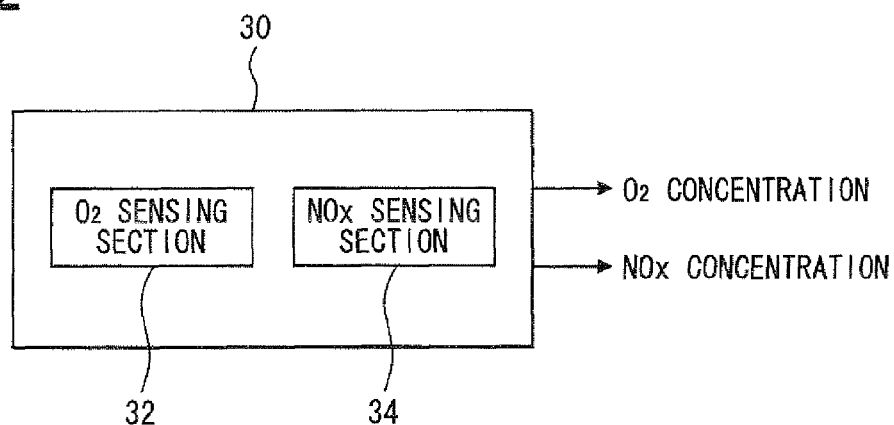
FIG. 2 is an explanatory diagram showing construction of a NOx sensor according to the embodiment.

The NOx sensor 30 is, for example, a well-known limiting current sensor and is provided downstream of the NOx catalyst 20. As shown in FIG. 2, the NOx sensor 30 has an O2 sensing section 32 and a NOx sensing section 34. The NOx sensor 30 outputs an O2 concentration and a NOx concentration as sensing signals.

The ECU 40 as a NOx sensor abnormality detection device includes CPU, RAM, ROM, a flash memory (which are not shown in the drawings) and the like. The ECU 40 acquires the engine operation state from the sensing signals of the various sensors such as an engine rotation speed sensor 4, an accelerator position sensor 6 and the NOx sensor 30 shown in FIG. 1. The ECU 40 controls the throttle opening degree of the throttle valve 12, the opening degree of the EGR valve 14, injection timing and injection quantity of the injector, addition quantity of the reducing agent added to the NOx catalyst 20 and the like based on the acquired engine operation state.

The ECU 40 functions as following devices based on control programs stored in the storage device such as the ROM or the flash memory of the ECU 40.

First, a function of the ECU 40 as an atmosphere determination device will be described. The ECU 40 determines that a gas atmosphere in the exhaust passage 110 is equivalent to the atmospheric air when the engine 2 is in either one of following engine operation states, for example. The ECU 40 may determine that the NOx concentration in the exhaust passage 110 is zero when the gas atmosphere in the exhaust passage 110 is equivalent to the atmospheric air.

(1) A state where fuel cut during deceleration is in execution.

When the engine 2 is in a fuel cut state during a decelerating operation, the exhaust gas discharged from the engine 2 into the exhaust passage 110 is substantially equivalent to the atmospheric air, and the NOx concentration is zero.

(2) A state where the engine stops:

When the engine 2 stops, the exhaust gas in the exhaust passage 110 is discharged to an outside by an exhaust gas discharge device (mentioned in detail later). Accordingly, in this case, the gas atmosphere in the exhaust passage 110 is substantially equivalent to the atmospheric air, and the NOx concentration is zero.

In either one of the above-described states (1) and (2), if the O2 sensing section 32 of the NOx sensor 30 is normal, the output signal of the O2 concentration of the NOx sensor 30 should show the value equivalent to the O2 concentration in the atmospheric air.

Next, a function of the ECU 40 as the exhaust gas discharge device will be described. When the engine 2 is stopped, the ECU 40 controls the throttle valve 12 to bring the throttle opening degree to a fully opened state. Thus, the exhaust gas in the exhaust passage 110 containing the NOx is discharged to the outside because of pumping of the engine 2 during a period since combustion in the cylinders of the engine 2 stops until the rotation of the engine 2 stops. As a result, the gas atmosphere in the exhaust passage 110 becomes equivalent to the atmospheric air, and the NOx concentration becomes zero.

In this way, since the exhaust gas in the exhaust passage 110 is discharged to the outside using the throttle valve 12, there is no need to newly provide a mechanism for discharging the exhaust gas of the exhaust passage 110 to the outside.

Next, a function of the ECU 40 as a sensed inclination calculation device will be described. If the atmosphere determination device determines that the gas atmosphere in the exhaust passage 110 is equivalent to the atmospheric air, the ECU 40 stores the NOx concentration, which is sensed with the NOx sensor 30 at a zero point of the NOx concentration, in the storage device such as the RAM.

Also, the ECU 40 stores the NOx concentration, which is sensed with the NOx sensor 30 in a steady operation state of the engine 2, in the RAM. The ECU 40 determines that the engine is in the steady operation state if fluctuations of the engine rotation speed and the fuel injection quantity become equal to or less than predetermined values.

The ECU 40 calculates the sensed inclination of the output of the NOx sensing section 34 based on the zero point of the NOx concentration sensed with the NOx sensor 30 and the NOx concentration sensed with the NOx sensor 30 in the steady operation state.

Next, a function of the ECU 40 as an O2 sensing section determination device will be described. As mentioned above, if the atmosphere determination device determines that the gas atmosphere in the exhaust passage 110 is equivalent to the atmospheric air and the O2 sensing section 32 of the NOx sensor 30 is normal, the output signal of the O2 concentration of the NOx sensor 30 should show the value equivalent to the O2 concentration in the atmospheric air.

Therefore, if the atmosphere determination device determines that the gas atmosphere in the exhaust passage 110 is equivalent to the atmospheric air, the ECU 40 determines whether the output signal of the O2 concentration of the NOx sensor 30 shows the value equivalent to the O2 concentration in the atmospheric air. Thus, it can be determined whether the O2 sensing section 32 of the NOx sensor 30 is normal.

Next, a function of the ECU 40 as an estimated NOx concentration calculation device will be described. The ECU 40 stores the O2 concentration sensed with the NOx sensor 30 in the RAM at the same time when the ECU 40 stores the NOx concentration sensed with the NOx sensor 30 in the steady operation state of the engine 2 in the RAM to calculate the sensed inclination of the output of the NOx sensing section 34. There is a correlation between the O2 concentration and the EGR quantity. There is also a correlation between the NOx concentration and the EGR quantity. As a result, there is also a correlation between the O2 concentration and the NOx concentration. Therefore, the ECU 40 stores the correlation between the O2 concentration and the NOx concentration as a map or the like beforehand such that the ECU 40 can calculate an estimated NOx concentration as an estimate of the NOx concentration in the exhaust gas from the O2 concentration based on the correlation between the O2 concentration and the NOx concentration.

Therefore, when the O2 sensing section determination device determines that the O2 sensing section 32 is normal, the ECU 40 calculates the estimated NOx concentration from the map or the like based on the O2 concentration sensed in the steady operation state.

Next, a function of the ECU 40 as an estimated inclination calculation device will be described. The ECU 40 calculates the estimated inclination of the output of the NOx sensor 30 in the case where the NOx sensing section 34 is normal based on the estimated NOx concentration calculated by the estimated NOx concentration calculation device when the O2 sensing section 32 is normal.

Figure 3:
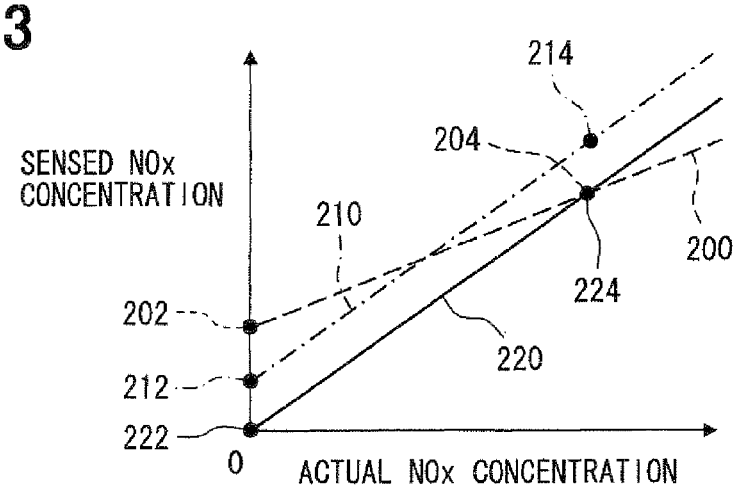
FIG. 3 is a characteristic diagram showing a relationship between actual NOx concentration and a sensed NOx concentration sensed with the normal/abnormal NOx sensor according to the embodiment.

Next, a function of the ECU 40 as an abnormality determination device will be described. FIG. 3 shows a relationship between an actual NOx concentration in the exhaust gas and the sensed NOx concentration sensed with the NOx sensor 30. In FIG. 3, a broken line 200 (or a chained line 210) shows an output characteristic of the NOx sensing section 34 passing through the zero point 202 (or 212) of the sensed NOx concentration sensed with the NOx sensor 30 when the atmosphere determination device determines that the gas atmosphere in the exhaust passage 110 is equivalent to the atmospheric air and the sensed NOx concentration 204 (or 214) sensed with the NOx sensor 30 in the steady operation state.

In FIG. 3, a solid line 220 shows an output characteristic of the NOx sensing section 34 passing through the estimated NOx concentration 224, which is calculated by the ECU 40 from the map or the like based on the O2 concentration sensed in the steady operation state in the case where the O2 sensing section 32 is determined to be normal, and the origin 222 at the time when the actual NOx concentration is zero If the NOx sensing section 34 is normal, the output characteristic of the NOx sensing section 34 coincides with the solid line 220.

If a gain deviation and an offset deviation arise in the output characteristic of the NOx sensing section 34, there is a possibility that the output characteristic becomes the output characteristic shown by the broken line 200. Even when the sensed NOx concentration 204 sensed with the NOx sensor 30 in the steady operation state coincides with the estimated NOx concentration 224 calculated from the map or the like based on the O2 concentration sensed in the steady operation state, the ECU 40 compares the inclination (i.e., the gain deviation) of the broken line 200 causing the gain deviation and the offset deviation with the inclination of the normal output characteristic shown by the solid line 220. When the difference between the inclinations is larger than a predetermined value, the ECU 40 determines that the NOx sensor 30 is abnormal.

The ECU 40 does not determine that the NOx sensor 30 is abnormal when the offset deviation occurs but the difference between the inclination of the output characteristic and the normal value is smaller than the predetermined value as shown by the chained line 210. It is because the NOx concentration can be sensed in consideration of the offset deviation of the output signal of the NOx sensing section 34 when the offset deviation occurs.

Figure 4:
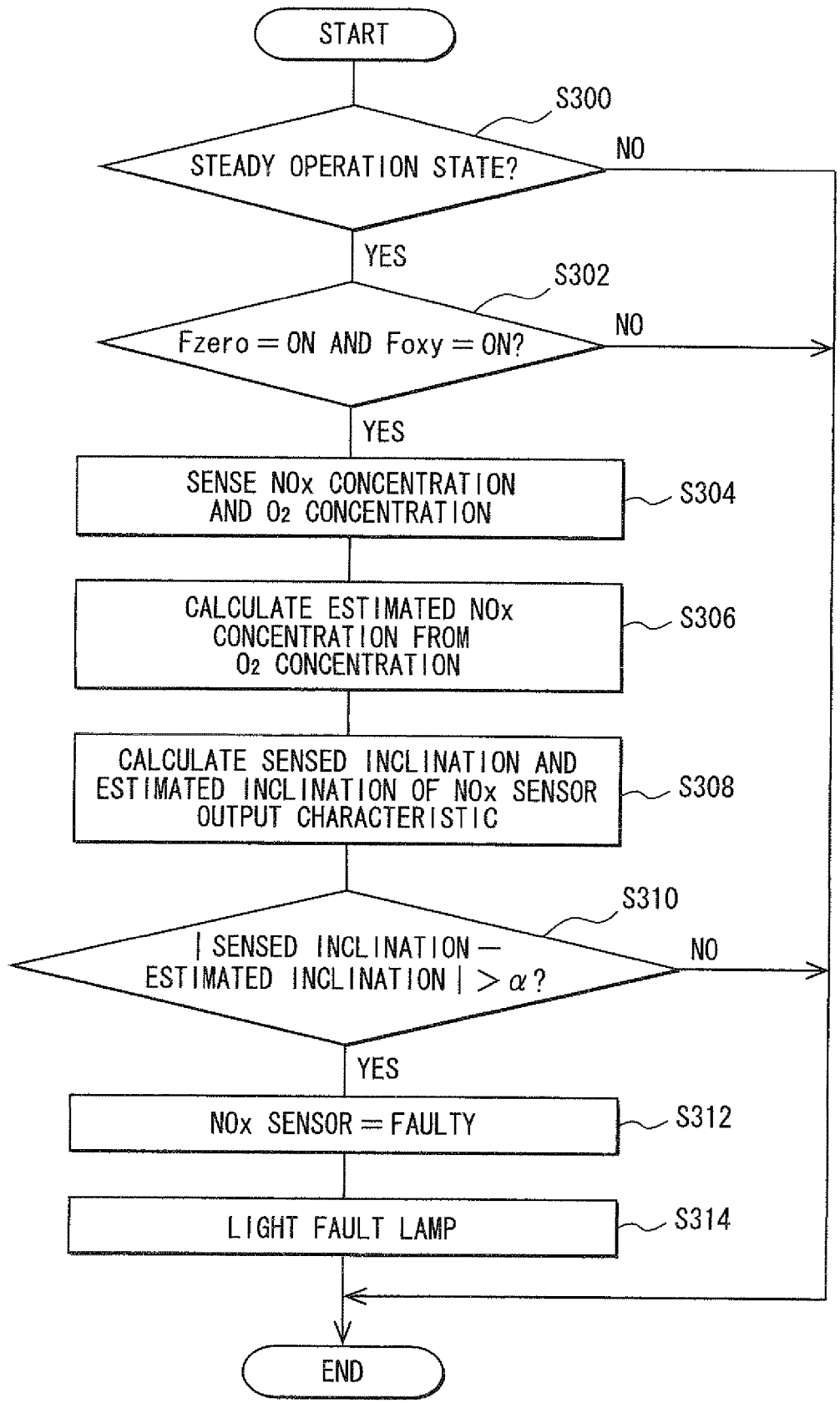
FIG. 4 is a first flowchart showing abnormality detection of the NOx sensor according to the embodiment.
Figure 5:
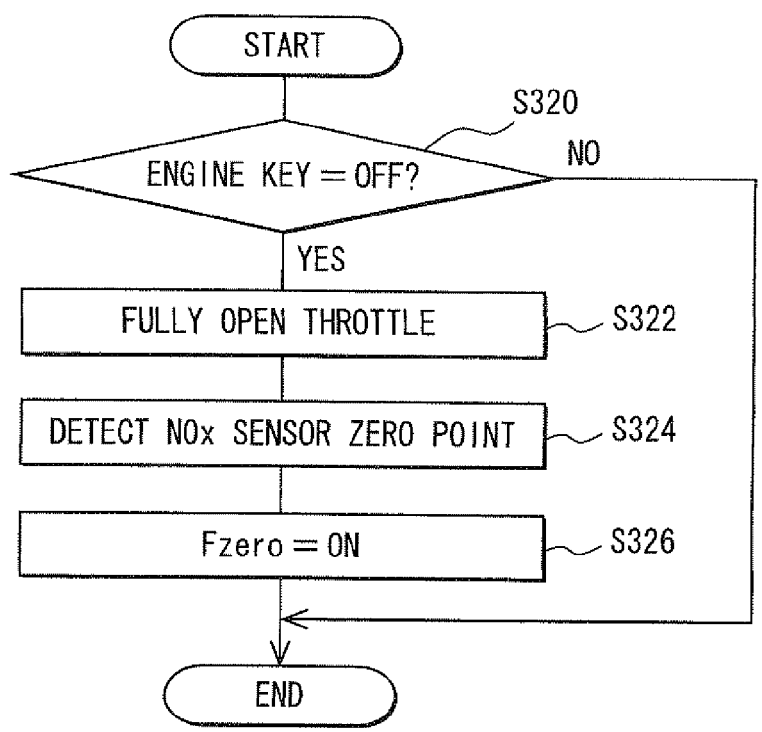
FIG. 5 is a second flowchart showing the abnormality detection of the NOx sensor according to the embodiment.
Figure 6:
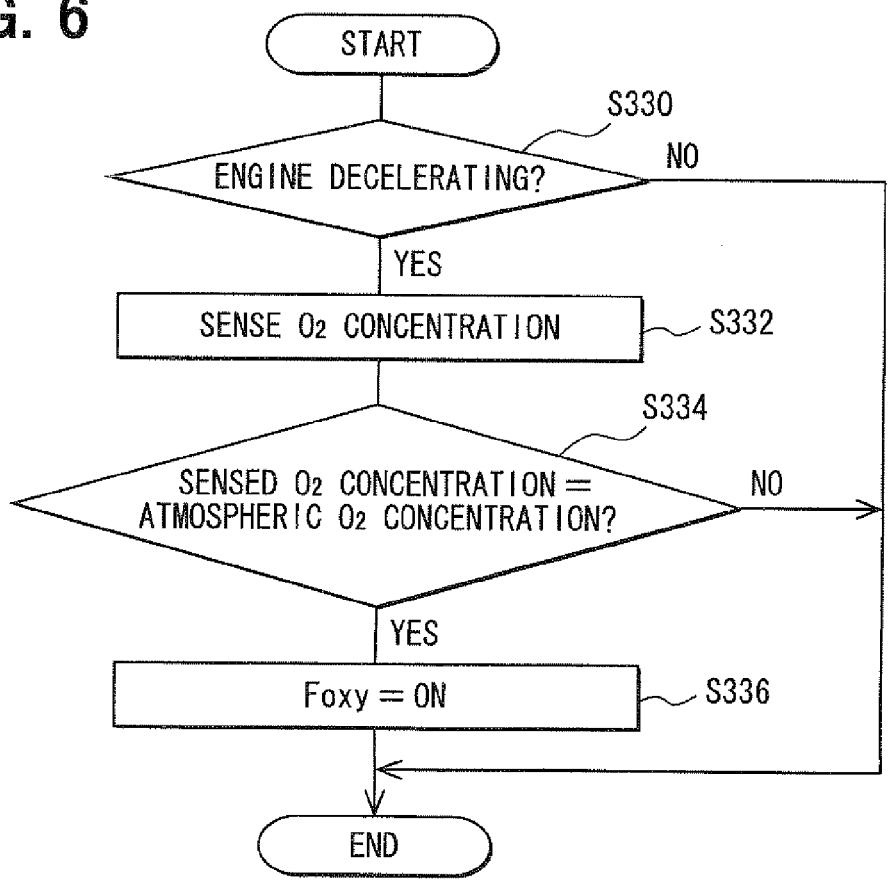
FIG. 6 is a third flowchart showing the abnormality detection of the NOx sensor according to the embodiment.

Next, abnormality determination of the NOx sensor of the exhaust gas purification system 10 according to the present embodiment will be explained based on abnormality determination routines of FIGS. 4 to 6. The abnormality determination routines of FIGS. 4 to 6 are invariably executed. Control programs for executing the routines shown in FIGS. 4 to 6 are stored in the storage device such as the ROM or the flash memory of the ECU 40.

In the abnormality determination routine 1 of FIG. 4, first in S300 (S means "Step"), the ECU 40 determines whether the engine 2 is in the steady operation state. When it is determined that the engine 2 is not in the steady operation state (S300: No), the ECU 40 ends the routine 1.

When the engine 2 is in the steady operation state (S300: Yes), the ECU 40 determines whether a NOx concentration zero point detection completion flag Fzero is ON and an O2 sensing section normality determination flag Foxy is ON in S302. The NOx concentration zero point detection completion flag Fzero and the O2 sensing section normality determination flag Foxy are set in FIGS. 5 and 6 respectively.

When the NOx concentration zero point detection completion flag Fzero is ON, it indicates that the sensing value at the zero point of the NOx concentration, the sensing value being sensed with the NOx sensing section 34 when the gas atmosphere in the exhaust passage 110 is equivalent to the atmospheric air and the NOx concentration is zero, is stored in the RAM or the like.

When the O2 sensing section normality determination flag Foxy is ON, it indicates that the O2 sensing section 32 is normal and is correctly sensing the O2 concentration in the exhaust gas. The ECU 40 ends the routine 1 when the NOx concentration zero point detection completion flag Fzero is OFF or when the O2 sensing section normality determination flag Foxy is OFF (S302: No).

When the NOx concentration zero point detection completion flag Fzero is ON and the O2 sensing section normality determination flag Foxy is ON (S302: Yes), the ECU 40 senses the NOx concentration and the O2 concentration from the output signals of the NOx sensor 30 in the steady operation state in S304. The O2 concentration sensed in S304 is the value sensed when the O2 sensing section 32 is normal and therefore is the correct value corresponding to the O2 concentration in the exhaust gas.

In S306, the ECU 40 calculates the estimated NOx concentration from the O2 concentration sensed together with the NOx concentration in S304. The estimated NOx concentration calculated in S306 is a value estimated to be sensed with the NOx sensing section 34 when the NOx sensing section 34 is normal.

In S308, the ECU 40 calculates the sensed inclination of the NOx concentration output characteristic of the NOx sensor 30 based on the NOx concentration in the steady operation state sensed in S304 and the zero point of the NOx concentration that is sensed when the gas atmosphere in the exhaust passage 110 is equivalent to the atmospheric air and that is stored in the RAM or the like.

Further, in S308, the ECU 40 calculates the estimated inclination of the NOx concentration output characteristic of the NOx sensor 30 in the case where the NOx sensor 30 is normal based on the estimated NOx concentration calculated from the O2 concentration in S306.

In S310, the ECU 40 determines whether an absolute value of a difference between the sensed inclination and the estimated inclination calculated in S308 is larger than a predetermined value $\alpha$. When the absolute value of the difference between the sensed inclination and the estimated inclination is equal to or smaller than the predetermined value $\alpha$ (S310: No), the ECU 40 determines that the NOx sensor 30 is not faulty and ends the routine 1.

When the absolute value of the difference between the sensed inclination and the estimated inclination is larger than the predetermined value $\alpha$ (S310: Yes), the ECU 40 determines that the NOx sensor 30 is faulty in S312. Then, in S314, the ECU 40 gives an alarm about the abnormality of the NOx sensor 30, for example, by lighting a fault lamp.

As mentioned above, the ECU 40 does not determine that the NOx sensor 30 is abnormal if the absolute value of the difference between the sensed inclination and the estimated inclination is equal to or smaller than the predetermined value $\alpha$ (S310: No) even when the NOx concentration output characteristic of the NOx sensor 30 has the offset deviation. In this case, the ECU 40 senses the NOx concentration based on the output signal of the NOx sensor 30 in consideration of the offset deviation.

Next, the abnormality determination routine 2 of FIG. 5 will be described. In S320 of FIG. 5, the ECU 40 determines whether an engine key is turned off. When the engine key is not OFF (S320: No), the ECU 40 ends the routine 2.

If the engine key is turned off (S320: Yes), the ECU 40 controls the throttle valve 12 to bring the throttle opening degree to the fully opened state in S322. Thus, the exhaust gas in the exhaust passage 110 is discharged to the outside. Accordingly, the gas atmosphere in the exhaust passage 110 becomes equivalent to the atmospheric air, and the NOx concentration in the exhaust passage 110 becomes zero.

In S324, the ECU 40 detects the zero point of the NOx concentration from the output of the NOx sensing section 34 of the NOx sensor 30 when the NOx concentration in the exhaust passage 110 is zero and stores the zero point in the storage device such as the RAM.

The ECU 40 switches on the NOx concentration zero point detection completion flag Fzero in S326 and ends the routine 2.

Next, the abnormality determination routine 3 of FIG. 6 will be described. In S330 of FIG. 6, the ECU 40 determines whether the engine 2 is decelerating. When the engine 2 is not decelerating (S330: No), the ECU 40 ends the routine 3.

When the engine 2 is decelerating (S330: Yes), the ECU 40 senses the O2 concentration from the output of the O2 sensing section 32 of the NOx sensor 30 in S332. The combustion in the cylinder of the engine 2 stops when the fuel cut is performed during the deceleration of the engine 2. As a result, if the fuel-cut state continues for a predetermined time or longer, the gas atmosphere in the exhaust passage 110 becomes equivalent to the atmospheric air. Therefore, if the O2 sensing section 32 of the NOx sensor 30 is normal, the output of the O2 sensing section 32 shows the O2 concentration in the atmospheric air.

In S334, the ECU 40 determines whether the O2 concentration sensed with the NOx sensor 30 in S332 is equal to the O2 concentration in the atmospheric air. When the sensed O2 concentration is not equal to the O2 concentration in the atmospheric air, the ECU 40 ends the routine 3.

When the sensed O2 concentration is equal to the O2 concentration in the atmospheric air (S334: Yes), the ECU 40 determines that the O2 sensing section of the NOx sensor 30 is normal. Then, the ECU 40 switches on the O2 sensing section normality determination flag Foxy in S336 and ends the routine 3.

According to the above-described present embodiment, it is determined whether the NOx sensor 30 is normal based on the sensed inclination of the NOx concentration output calculated based on the NOx concentration sensed with the NOx sensor 30 and the estimated inclination of the NOx concentration output in the case where the NOx sensor 30 is normal.

As a result, the abnormality of the NOx sensor 30 can be determined with high accuracy when the gain deviation occurs in the output of the NOx sensor 30 and causes the deviation in the inclination of the output. It is not determined that the NOx sensor 30 is abnormal if the deviation in the inclination of the NOx concentration output of the NOx sensor 30 is within the predetermined range even when the offset deviation is caused in the NOx concentration output of the NOx sensor 30. Thus, the NOx concentration can be sensed with high accuracy based on the NOx concentration output of the NOx sensor 30 in consideration of the offset deviation of the NOx concentration output.

In the above-described embodiment, it is determined whether the O2 sensing section 32 is normal based on the output of the O2 sensing section 32 sensing the O2 concentration in the exhaust passage 110, which becomes equivalent to the atmospheric air when the fuel cut is performed during the deceleration of the engine 2. Alternatively, it may be determined whether the O2 sensing section 32 is normal based on the output of the O2 sensing section 32 sensing the O2 concentration in the exhaust passage 110, which becomes equivalent to the atmospheric air if the throttle opening degree is brought to the fully opened state when the engine 2 is stopped by turning off the engine key.

The NOx abnormality detection device of the present invention can be also applied to any other internal combustion engine than the diesel engine as long as the internal combustion engine combusts the fuel and discharges the NOx. For example, the present invention can be applied to an exhaust gas purification system of a gasoline engine or the like.

In the above-described embodiment, the functions of the atmosphere determination device, the sensed inclination calculation device, the O2 sensing section determination device, the estimated NOx concentration calculation device, the estimated inclination calculation device, the abnormality determination device and the exhaust gas discharge device are realized by the ECU 40, the functions of which are specified by the control programs Alternatively, at least a part of the functions of the above-described multiple devices may be realized with hardware, a function of which is specified by its circuit configuration.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A NOx sensor abnormality detection device of a NOx sensor that is provided downstream of a NOx purification device provided in an exhaust passage of an internal combustion engine and that has a NOx sensing section for sensing a NOx concentration in exhaust gas and an O2 sensing section for sensing an O2 concentration in the exhaust gas, the NOx sensor abnormality detection device comprising:
    an atmosphere determination means for determining whether a gas atmosphere in the exhaust passage is equivalent to an atmospheric air;
    a sensed inclination calculation means for calculating a sensed inclination of an output of the NOx sensing section based on a zero point of the NOx concentration sensed with the NOx sensing section when the atmosphere determination means determines that the gas atmosphere in the exhaust passage is equivalent to the atmospheric air and the NOx concentration sensed with the NOx sensing section in a steady operation state of the internal combustion engine;
    an O2 sensing section determination means for determining whether the O2 sensing section is normal;
    an estimated NOx concentration calculation means for calculating an estimate of the NOx concentration based on the O2 concentration sensed with the O2 sensing section when the NOx sensing section senses the NOx concentration in the steady operation state for the calculation of the sensed inclination in the case where the O2 sensing section determination means determines that the O2 sensing section is normal;
    an estimated inclination calculation means for calculating an estimated inclination of the output of the NOx sensing section in the case where the NOx sensing section is normal based on the estimate of the NOx concentration; and
    an abnormality determination means for determining an abnormality in the NOx sensor based on the sensed inclination and the estimated inclination.

2. The NOx sensor abnormality detection device as in claim 1, further comprising:
    an exhaust gas discharge means for discharging the exhaust gas of the exhaust passage to an outside when the internal combustion engine stops, wherein
    the atmosphere determination means determines that the gas atmosphere in the exhaust passage is equivalent to the atmospheric air if the exhaust gas discharge means discharges the exhaust gas of the exhaust passage to the outside.

3. The NOx sensor abnormality detection device as in claim 2, wherein
    the exhaust gas discharge means discharges the exhaust gas of the exhaust passage to the outside by fully opening a throttle valve when the internal combustion engine stops.

4. The NOx sensor abnormality detection device as in claim 1, wherein
    the atmosphere determination means determines that the gas atmosphere in the exhaust passage is equivalent to the atmospheric air when fuel cut is performed during deceleration of the internal combustion engine.

5. The NOx sensor abnormality detection device as in claim 1, wherein
    the O2 sensing section determination means determines that the O2 sensing section is normal when the atmosphere determination means determines that the gas atmosphere in the exhaust passage is equivalent to the atmospheric air and the O2 concentration sensed with the O2 sensing section is equal to the O2 concentration in the atmospheric air.

6. An exhaust gas purification system comprising:

a NOx purification device provided in an exhaust passage of an internal combustion engine;

a NOx sensor that is provided downstream of the NOx purification device and that has a NOx sensing section for sensing a NOx concentration in exhaust gas and an O2 sensing section for sensing an O2 concentration in the exhaust gas; and the NOx sensor abnormality detection device as in claim 1.

* * * * *